Figure 1:
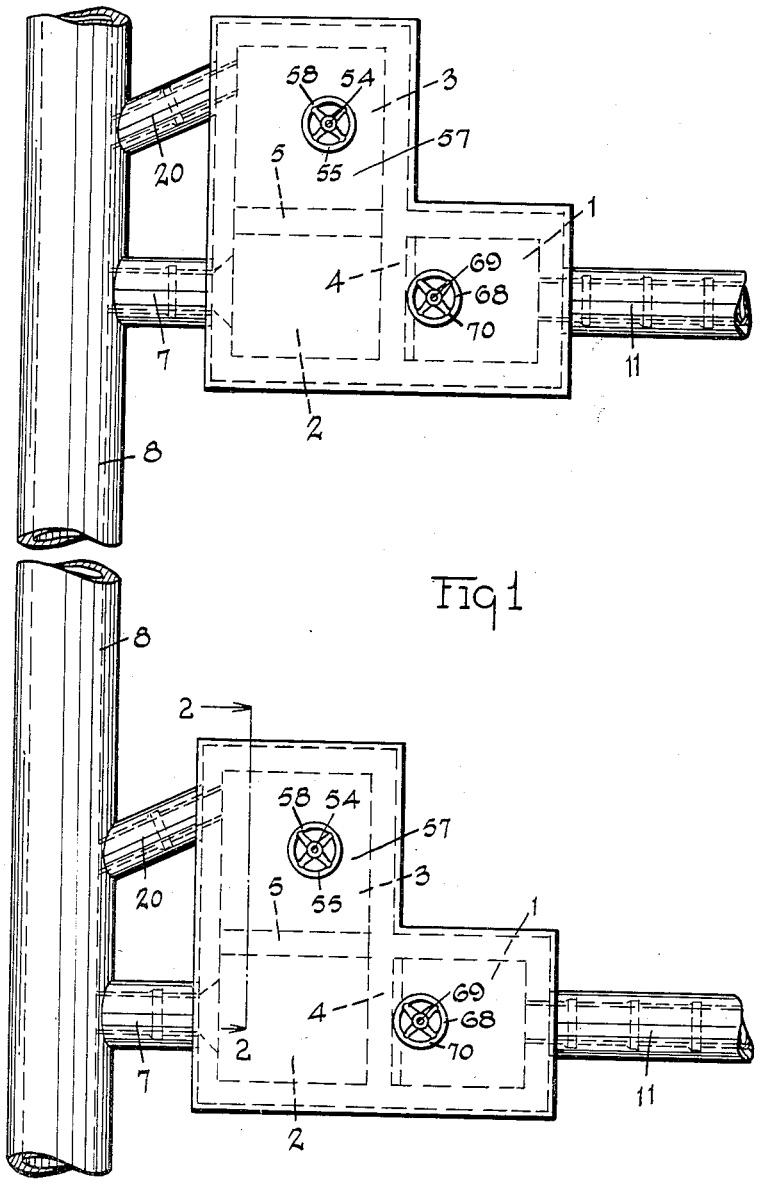

Aug. 14, 1934.  C. S. BROWN  1,969,964
REGULATOR VALVE
Filed March 2, 1932      5 Sheets-Sheet 1

Inventor
Chalmers S. Brown
By
Attorney

Aug. 14, 1934.  C. S. BROWN  1,969,964
REGULATOR VALVE
Filed March 2, 1932  5 Sheets-Sheet 3

Inventor
Chalmers S. Brown
By Faust F. Crampton
Attorney

Aug. 14, 1934.  C. S. BROWN  1,969,964
REGULATOR VALVE
Filed March 2, 1932   5 Sheets-Sheet 5
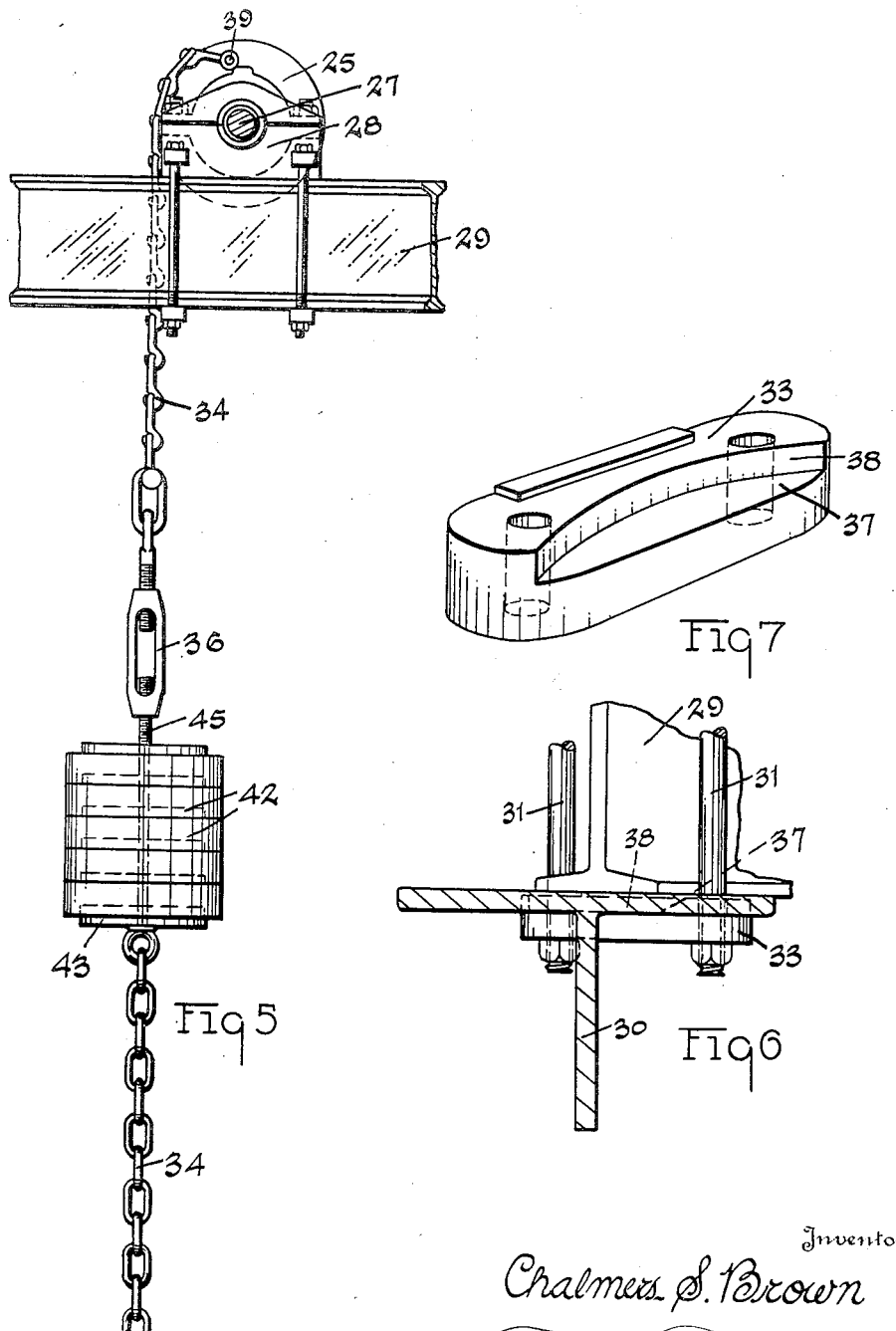

Patented Aug. 14, 1934

1,969,964

UNITED STATES PATENT OFFICE 1,969,964

REGULATOR VALVE

Chalmers S. Brown, Lima, Ohio, assignor to Brown & Brown, Inc., Lima, Ohio, a corporation of Ohio Application March 2, 1932, Serial No. 596,230

8 Claims. (Cl. 137—78)

The invention particularly relates to regulator valve constructions which automatically control the volume of liquid flowing from tributary lines into, and according to the volume of liquid in, a main or interceptor line into which they empty.

The invention has for its particular object to provide, in a plurality of chambers, associated parts of the regulator valve so that the existent volume or pressure of liquid in the interceptor may be utilized to control the operation of a part of the regulator valve in combination with other parts of the valve which may be located in other of the chambers. One of the chambers may thus be connected to the interceptor and liquid diverted into the chamber to cause opening and closing of the regulator valve according to its established level.

The invention has for its object to control the regulator valve by a suitable buoyant member located in one of the chambers so as to be actuated by the level of the liquid directed into the chamber.

The invention also has for its object to provide manual means for controlling the movement of the buoyant member to vary the position of the regulator valve gate. The buoyant member may thus be raised or lowered to maintain the regulator valve open or closed according to desired conditions. The invention also provides means for closing the regulator valve at its intake so that the desired operating limits of the buoyant member may still be maintained though the flow of water has been stopped from the tributary line or pipe.

The invention has a further object to avoid variation in the effective weight of the valve by the horizontal displacement of the center of gravity of the load or weight of the regulator valve gate as it is operated to increase or decrease the effective area at the outlet of the valve. Suitable means, such as weight members, may be located on the gate below the point at which the lifting means is connected. As the center of gravity of the gate becomes displaced and moves toward the pivotal centers of the gate as it is raised, the weight members maintain a constant load on the float and thus produce an opening area quite in proportion to the displacement of the float.

The invention further provides suitable clamping means for the supporting beams of parts of the regulator valve construction. The clamping means may be provided with recessed areas to form shoulders for engaging portions of wall brackets. The recessed areas increase the security of the clamping relation of the parts and allow location of the beams at variant angles to the brackets.

The invention consists in other features and advantages which will appear from the following description and upon examination of the drawings. Structures containing the invention may partake of different forms and may be varied in their details and still embody the invention. To illustrate a practical application of the invention, I have selected an automatic regulator valve embodying the invention as an example of the various structures, and the details of such structures that contain the invention and shall describe the selected structure hereinafter, it being understood that variations may be made and that certain features of my invention may be used to advantage without a corresponding use of other features, and without departing from the spirit of the invention. The particular structure selected is shown in the accompanying drawings.

Figure 2:
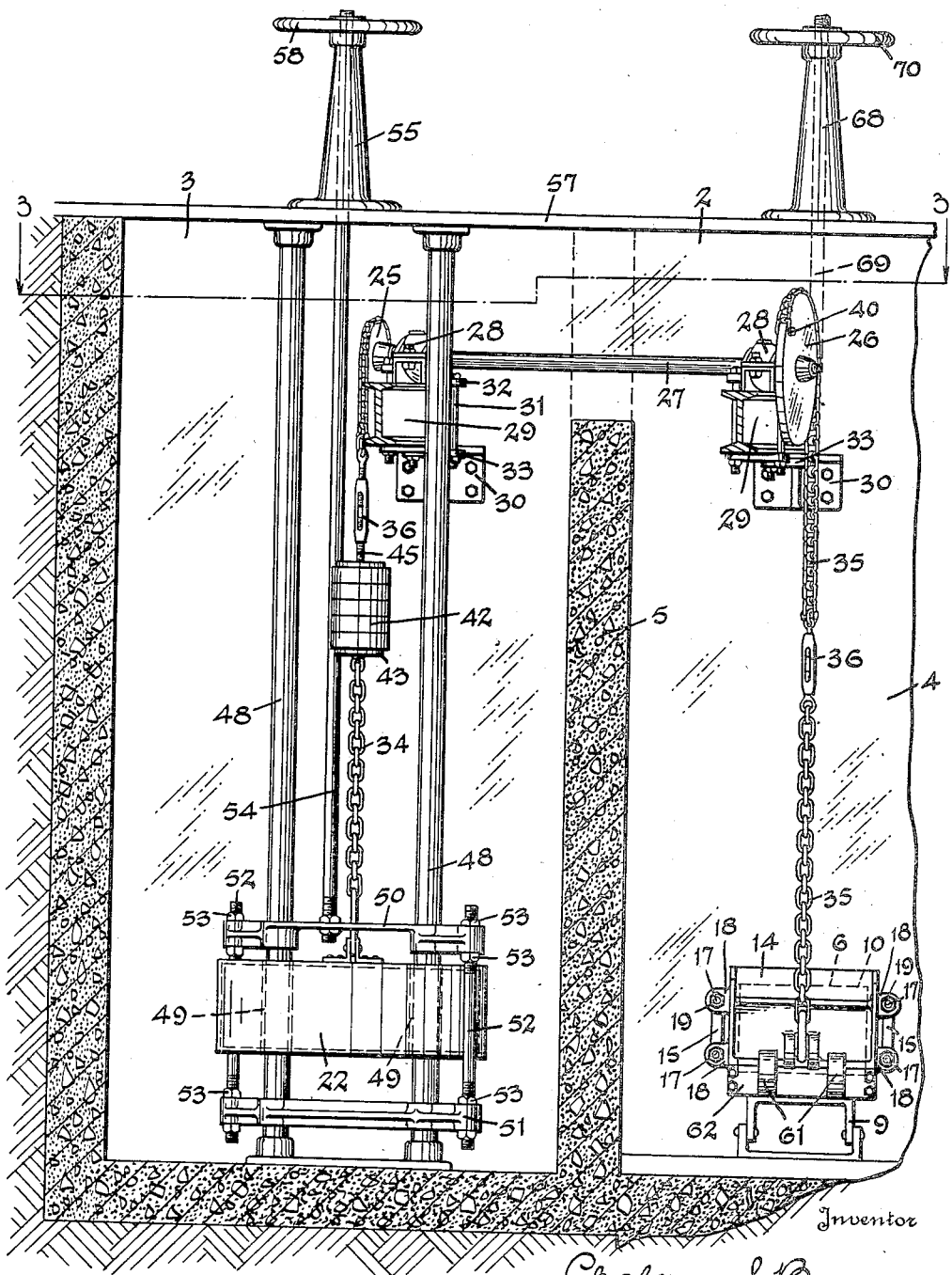
Figure 3:
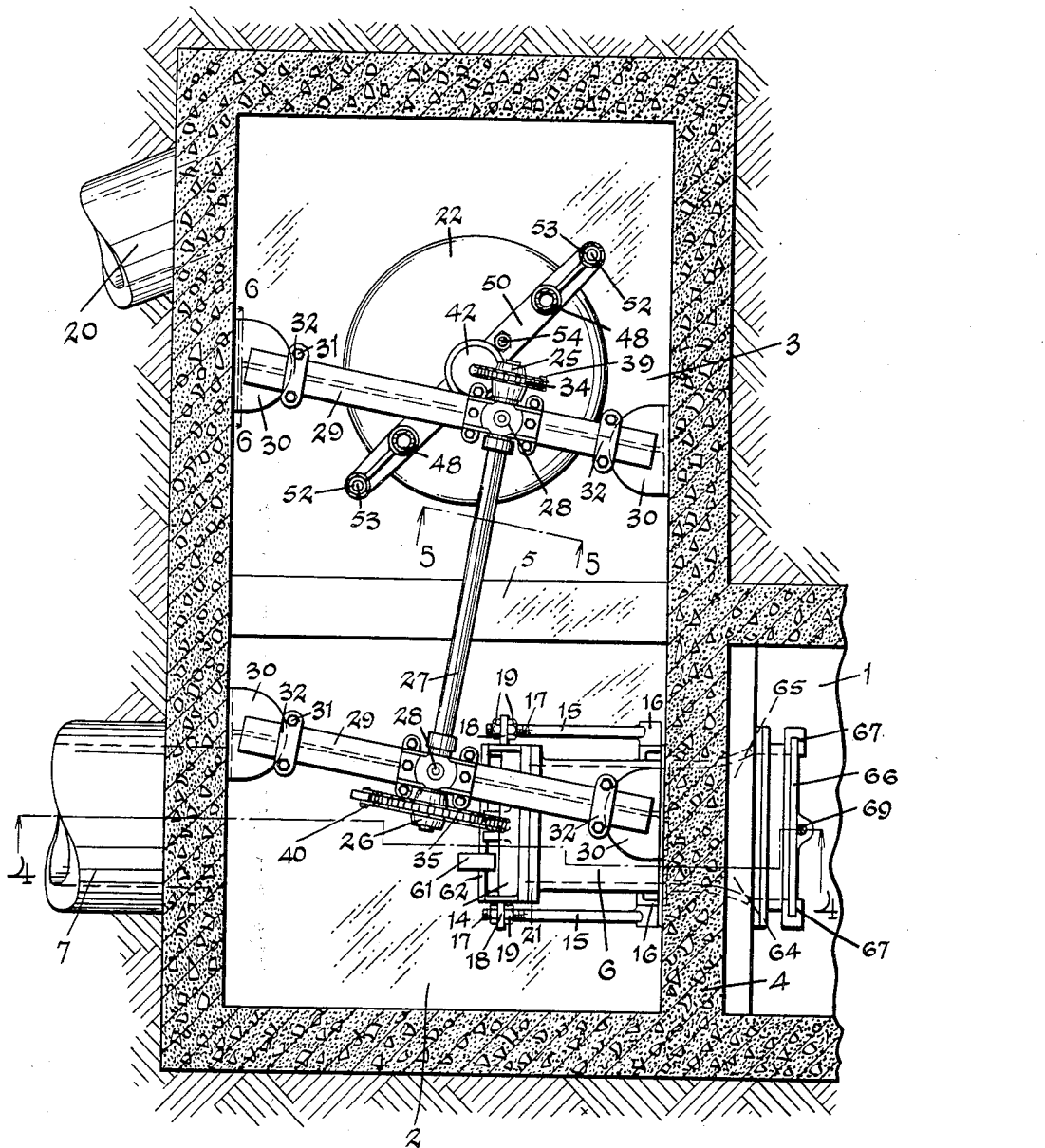
Figure 4:
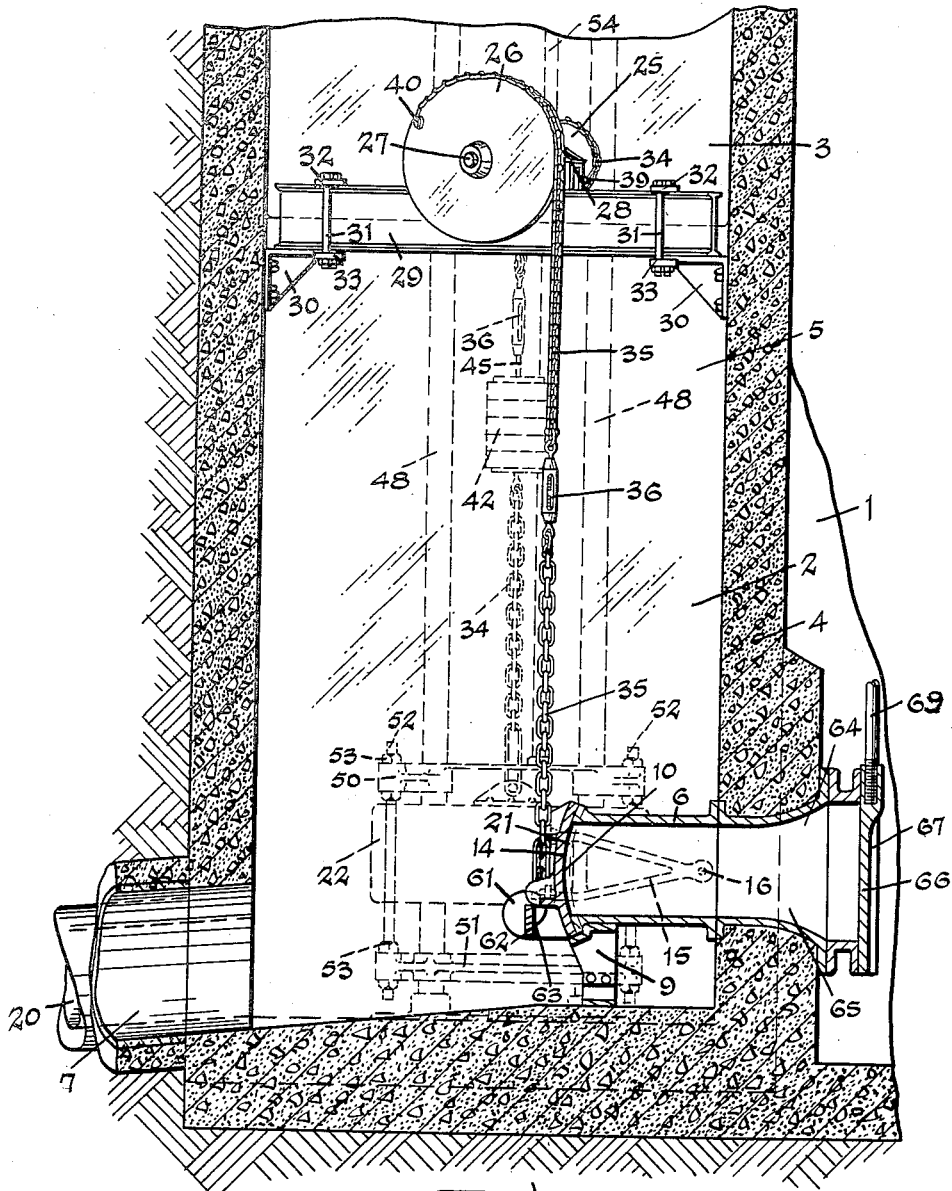

Fig. 1 is a diagrammatic view of a plurality of regulator valves and interconnecting pipes which they may control. Fig. 2 illustrates a view of a section taken on the plane of the line 2—2 indicated in Fig. 1. Fig. 3 illustrates a view of a section taken on the plane of the line 3—3 indicated in Fig. 2. Fig. 4 illustrates a view of a section taken on the plane of the line 4—4 indicated in Fig. 3. Fig. 5 illustrates a view of a section taken on the plane of the line 5—5 indicated in Fig. 3. Fig. 6 illustrates a view of a section taken on the plane of the line 6—6 as indicated in Fig. 3. Fig. 7 is a perspective view of one form of a clamping plate.

In the particular form of construction shown in the drawings, the regulator valve is adapted to automatically control the volume of sewage or waste water flowing from a tributary or trunk sewer into an intercepting sewer according to the volume of water passing through the interceptor. The parts of the regulator valve are located in a series of chambers 1, 2, and 3 which may be separated from each other by partitioning walls 4 and 5. The body portion or regulator tube 6 of the valve may thus be located in the wall 4 between the chambers 1 and 2 to direct the water flowing from the trunk sewer 11 and the chamber 1 into the chamber 2 and to a pipe 7 communicating with the interceptor 8. The body 6 of the valve is substantially rectangular in cross section and at its outlet 10 may be supported by a suitable member 9. The member 9 is formed of upper and lower parts which may be adjustably secured together so that irregularities of floor elevation may be eliminated when the regulator valve is installed.

The outlet 10 of the regulator tube 6 may be closed by a gate or shutter 14. In order to support the shutter for pivotal movements to vary the effective area of the outlet of the valve, suitable radial members 15 are journalled on trunnions 16 and are adjustably connected to the shutter 14 by threaded portions 17 extending through ears 18 formed on the sides of the shutter 14. Nuts 19 may be located on the threaded portions and on opposite sides of the ears 18 to properly position the shutter 14 relative to the sides of the valve outlet 10. The body of the shutter and the sides 21 of the outlet 10 are formed on an arc described from the axes of the trunnions 16 so that the shutter 14 will seat on the side surfaces 21 of the outlet 14 at any angle in which the shutter may be located to reduce or increase the effective area of the valve outlet 10. The shutter 14 of the regulator may thus be operated to restrict the volume of water flowing from the chamber 1 to the interceptor 8 and, as the volume of water passing through the intercepting sewer 8 is materially increased so that treatment areas with which it may communicate will be overloaded, the shutter 14 will be operated to accordingly reduce the effective area to the outlet 10 of the regulator valve.

In order to automatically control the flow of water according to the existent volume passing through the interceptor, a by-pass or tell-tale 20 may be utilized to divert portions of the water into the chamber 3. As the volume is increased, a buoyant member or float 22 will be raised by the level or buoyant force of the water. The float may be operatively connected to the shutter 14 in the chamber 2 and control the flow of water through the regulator tube 6 of the valve in proportionate amounts to the variant water level in the chamber 3. The ratio of movement of the shutter 14 to the float 22 may be predetermined by connecting the parts to suitable sprocket wheels 25 and 26. The sprocket wheels are mounted on the opposite ends of a shaft 27 which may be journalled in suitable bearings 28. The bearings 28 may be secured to I-beams 29. The I-beams are supported at their ends on fixed wall brackets 30 and secured thereto by bolts 31 which extend through clamping plates 32 and 33 above and below the I-beams. The plates 33, engaging the lower surfaces of the I-beams, are recessed, as at 37, to also engage the under surfaces of the wall brackets 30. The recesses 37 may have arcuate side walls 38 formed to contact the side edges of the brackets at any angle in which the plates 33 may be located. The angular positioning of the plates 33 may be caused by location of the sprocket wheels 25 and 26 above their related parts, the shutter 14 and the float 22. Since the shutter 14 is located in the chamber 2 and the float in the chamber 3, one of the I-beams 29 will be located in each of the chambers. The sprocket wheels 25 and 26 will thus be supported so that suitable connecting means, such as the chains 34 and 35, will operate to raise the shutter as the float 22 is lowered by a variance of water level, or lower the shutter 14 as the level raises, thereby controlling the effective area of the outlet 10 of the regulator tube 6 as the volume of water in the chamber 3 is affected by the water passing through the intercepting sewer 8.

The chains 34 and 35 may be connected to the sprocket wheels 25 and 26, as by the bolts 39 and 40, the points of connection being located on opposite sides of the shaft 27 so that rotation of the wheel 25 will release one chain while portions of the other chain will become located on the periphery of the sprocket wheel 26. The effective length of the chains may be adjusted by the turnbuckles 36 which interconnect the upper and lower portions of the chains 34 and 35. Thus rotation of the sprocket wheel 25, as produced by a drop of water level in the chamber 3, will impart rotary movement to the shaft 27 and the sprocket wheel 26 to draw portions of the chain 35 over the periphery of the sprocket wheel 26, thereby raising the shutter 14. Since the buoyant force of the float 22 will decrease as the water level drops in the chamber 3, the weight of the shutter 14 must be counterbalanced in the chain 34 sufficiently to assist the float 22 in raising the shutter to increase the effective area of the outlet 10 of the regulator valve.

To balance the weight of the shutter 14 so that a force sufficient to operate it will be added to the weight of the float 22, suitable weight members 42 are supported on one of the eye-bolts of the turnbuckle 36 in the chain 34. The weight members 42 are preferably formed in sections so that their combined weight may be varied to obtain the desired counterbalancing effect. The members 42 have central openings for receiving the eye-bolt 45 and on their upper and lower surfaces may be provided with suitable areas for nesting one on top of the other and for receiving a washer 43 secured to the head of the eye-bolt 45. As the volume of water passing through the intercepting sewer 8 becomes materially decreased, the weight of the members 42 will assist the float 22 in raising the shutter 14 to permit a more rapid flow of water from the trunk sewer 11 and the chamber 1.

To afford means for manually controlling the float 22, suitable limiting bars may be located in the path of the float and engage it when they are manipulated from an adjacent point. The float is, therefore, slidably mounted on guideways 48 which extend through suitable sleeves 49 secured in the upper and lower surfaces of the float 22. In order to limit the movement of the float, bars 50 and 51 may be located above and below the float 22 and mounted on the guideways 48. The bars are interconectned by tie-rods 52. The tie-rods 52 have threaded end portions for receiving the nuts 53 which engage the upper and lower surfaces of each of the bars 50 and 51 so that variation in the distance between the bars may be made by adjusting the positions of the nuts. The bars may thus be moved as a unit and to determine their position from an exterior point, the bar 50 is connected by a shaft 54 to a suitable floor-stand 55. The floor-stand 55 may be mounted on a platform located within the chamber 3, or, as shown in Fig. 2, on a roof 57 which covers the chambers 1, 2 and 3. The outlet 10 of the regulator valve may thus be closed by rotating the hand-wheel 58 of the floor-stand 55 and cause the shaft 54 to raise the float 22 by the bars 50 and 51. The float 22 will be supported on the lower bar 51 and, when the bars have been raised sufficiently, the float 22 will be positioned so that a subsequent rise of water in the chamber 3 will neither effect the control of the shutter 14 nor allow the shutter to open the outlet 10 of the valve as the water level drops. The distance of travel, particularly the maximum high and low points of the float's travel in relation to the valve's open and closed positions, may also be predetermined by movement of the bars 50 and 51. Thus the distance of travel of the float 22 may be manually controlled and operation of the shutter 14 by the float may be temporarily suspended by removal of the float from the vicinity of the water level in the chamber 3.

It has been found that as the shutter 14 is raised, the resistant force of its weight is thrown rearwardly onto the trunnions 16 which causes variations to occur and the shutter to be moved with greater ease when the valve is only slightly open. To balance the weight of the shutter 14, as it is raised from a substantially closed position, suitable members may be attached to the shutter 14 at a point below the connection of the chain 35 to the shutter. The members 61 are located on a bar 62 bolted to the face of the shutter and may be varied in number according to the desired balance to be obtained. For ease of attachment, the members 61 are slotted, as at 63, substantially the depth of the bar 62 and also so that the major portion of the weight will be located on the outer surface of the bar.

If desired, the intake of the regulator tube 6 may be formed to assure full capacity of flow from the chamber 1 or to approximate the vena contracta of the flowing water. For this purpose, the intake 64 of the valve may be provided with flared or bell-shaped side portions 65. The intake 64 may also be closed by a suitable sluice gate 66. The sluice gate is substantially the dimensions of the bell-shaped mouth 64 or intake of the valve and may be slidably supported in guideways 67 formed in the body of the regulator 6. The guideways 67 may be secured to or formed integrally on the body 6 of the valve and so as to extend vertically. The gate 66 is manually operated from the roof 57 by a floor-stand 68, a suitable shaft 69 being connected to the gate and having its upper end portion threaded into the hub of the hand-wheel 70 in a manner well known in the art.

I claim:

1. In a sewer interceptor and trunk line control valve, a valve chamber and a float chamber, a float located in the float chamber, a gate tube protruding into the valve chamber, the valve member having a pair of arms for pivotally supporting the valve, brackets located on opposite side walls of each chamber and having circular end edges, beams supported by the brackets and two sets of clamping plates for securing the beams to the brackets, one set of clamping plates having arcuate shoulders fitting the said circular end edges of the brackets, a shaft rotatably supported on the said beams and overhanging the chambers, sprocket wheels connected to the ends of the shaft, a chain connected to the float and secured to one sprocket wheel to rotate the shaft when the float descends in response to the changes of the level of the liquid in the float chamber, and a chain connected to the other sprocket wheel and to the valve member.

2. In a sewer interceptor and trunk line control valve, a valve chamber and a float chamber, a float located in the float chamber, a gate tube having a bell mouth end corresponding to the vena contracta of the stream and communicating with a trunk line and protruding into the valve chamber, a valve for closing the inner end of the tube, a shaft rotatably supported and overhanging the chambers, means for adjusting the shaft relative to the float and the valve sprocket wheels connected to the ends of the shaft, a chain connected to the float and secured to one sprocket wheel to rotate the shaft when the float descends in response to the changes of the level of the liquid in the float chamber, a chain connected to the other sprocket wheel and to the valve member.

3. In a sewer interceptor and trunk line control valve, a valve chamber and a float chamber, a float located in the float chamber, a gate tube communicating with a trunk line and protruding into the valve chamber and having arcuate inner end edges, an arcuate valve member conforming to the arcuate end edges of the tube, the valve member having a pair of arms for pivotally supporting the valve to move the valve member about the center of the arc of the edges of the tube, a shaft rotatably supported and overhanging the chambers, sprocket wheels connected to the ends of the shaft, a chain connected to the float and secured to one sprocket wheel to rotate the shaft when the float descends in response to the changes of the level of the liquid in the float chamber, a chain connected to the other sprocket wheel and to the valve member, and weights supported on the valve member for adjustably locating the center of gravity of the valve member and its arms at the point of connection of the chain with the valve member, a frame enclosing the float for limiting the movement of the float and a manual operated means connected to the float through the top of the chamber for raising and lowering the frame to close and open the valve by operation of the said shaft.

4. In a sewer interceptor and trunk line control valve, a valve chamber, and a float chamber, a float located in the float chamber, a gate tube communicating with a trunk line and protruding into the valve chamber and having arcuate inner end edges, an arcuate valve member conforming to the arcuate end edges of the tube, the valve member having a pair of arms for pivotally supporting the valve to move the valve member about the center of the arc of the edges of the tube, a shaft rotatably supported and overhanging the chambers, sprocket wheels connected to the ends of the shaft, a chain connected to the float and secured to one sprocket wheel to rotate the shaft when the float descends in response to the changes of the level of the liquid in the float chamber, a chain connected to the other sprocket wheel and to the valve member, and weights supported on the valve member for adjustably locating the center of gravity of the valve member and its arms at the point of connection of the chain with the valve member.

5. In a sewer interceptor and trunk line control valve, a valve chamber and a float chamber, a float located in the float chamber, a gate tube communicating with a trunk line and protruding into the valve chamber and having arcuate inner end edges, an arcuate valve member conforming to the arcuate end edges of the tube, the valve member having a pair of arms for pivotally supporting the valve to move the valve member about the center of the arc of the edges of the tube, a shaft rotatably supported and overhanging the chambers, sprocket wheels connected to the ends of the shaft, a chain connected to the float and secured to one sprocket wheel to rotate the shaft when the float descends in response to the changes of the level of the liquid in the float chamber, a chain connected to the other sprocket wheel and to the valve member, and weights supported on the valve member and its arms at the point of connection of the chain with the valve member, and weights connected to the chain in the float chamber for counterbalancing the weight of the valve and the weights attached to the valve.

6. In a sewer interceptor and a trunk line control valve, a float chamber and a valve chamber, a float located in the float chamber, a gate tube protruding into the valve chamber and having arcuate inner edges, an arcuate valve member conforming to the arcuate end edges of the tube, the valve member pivotally supported at the centers of the arcs of the end edges of the gate tube, the valve member having a bracket extending from the valve member in a direction away from the gate tube, a weight supported on the bracket, means connected to the float and connected to the valve member at a point intermediate the weight and the pivot points of valve member to support the parts connected to the valve member in substantially a balanced relation and operative to move the valve member according to the changes in the level of the liquid in the float chamber.

7. In a sewer interceptor and a trunk line control valve, a float chamber and a valve chamber, a float located in the float chamber, a gate tube protruding into the valve chamber and having arcuate inner edges, an arcuate valve member conforming to the arcuate end edges of the tube, the valve member having a pair of arms, means for pivotally supporting the arms at their ends for pivotal movements of the valve about the pivot points of the said arms and along the arc of the inner edges of the tube and means interconnecting the float and the valve member to move the valve member according to the changes in the level of the liquid in the float chamber, a weight part, means for supporting the weight part on the side of the valve member opposite to that on which said pivot points are located to locate the center of gravity of the combined mass of the valve member, the arms and the weight part substantially at the point of connection of the means for interconnecting the float with the valve member.

8. In a sewer interceptor and a trunk line control valve, a float chamber and a valve chamber, a float located in the float chamber, a gate tube connecting with a trunk line and protruding into the valve chamber and having arcuate inner end edges, an arcuate valve member conforming to the arcuate end edges of the tube, the valve member having a pair of arms pivotally supported on the inwardly protruding part of the gate tube and for pivotally supporting the valve member to move the valve member about the center and along the arc of the inner end edges of the tube and a shaft rotatively supported in the chamber, means interconnecting the float and the shaft for rotating the shaft as the level of the liquid in the float chamber changes, and means connecting the shaft and the valve member for moving the valve member according to the changes in the level of liquid in the float chamber, weights supported on the valve member for adjustably disposing the center of gravity of the combined weight of the valve member, the arms and the weights substantially at the point of connection of the said shaft and valve member connecting means.

CHALMERS S. BROWN.